US009658982B2

(12) United States Patent
Chen et al.

(10) Patent No.: US 9,658,982 B2
(45) Date of Patent: May 23, 2017

(54) DATA STRUCTURE PRODUCT AND METHOD FOR INTERFACE TRANSMISSION

(71) Applicant: PRINCETON TECHNOLOGY CORPORATION, New Taipei (TW)

(72) Inventors: Chun-Hsiung Chen, New Taipei (TW); Chieh Yung Tu, New Taipei (TW)

(73) Assignee: PRINCETON TECHNOLOGY CORPORATION, New Taipei (TW)

( * ) Notice: Subject to any disclaimer, the term of this patent is extended or adjusted under 35 U.S.C. 154(b) by 283 days.

(21) Appl. No.: 13/839,897

(22) Filed: Mar. 15, 2013

(65) Prior Publication Data

US 2014/0149708 A1    May 29, 2014

(30) Foreign Application Priority Data

Nov. 23, 2012    (TW) .............................. 101143866 A (51) Int. Cl.
  *G06F 12/00*    (2006.01)
  *G06F 13/42*    (2006.01)
  *G06F 12/0879*  (2016.01)

(52) U.S. Cl.
  CPC ........ *G06F 13/423* (2013.01); *G06F 12/0879* (2013.01); *G06F 2213/3802* (2013.01)

(58) Field of Classification Search
  CPC ......... G06F 12/0879; G06F 2212/7206; G06F 13/1689
  USPC ...................... 710/124, 5, 30; 711/167, 169; 709/230–233, 236–237; 718/104; 712/32
  See application file for complete search history.

(56) References Cited

U.S. PATENT DOCUMENTS

| 5,638,534 A * | 6/1997 | Mote, Jr. ................. G06F 13/18 711/105 |
| 7,290,066 B2 * | 10/2007 | Voorhees et al. ................. 710/5 |
| 7,917,659 B2 * | 3/2011 | Maharana ........... G06F 13/4072 710/24 |
| 8,473,695 B2 * | 6/2013 | Morrison ................ G06F 13/16 711/154 |
| 2005/0273564 A1 * | 12/2005 | Lakshmanamurthy ........................... G06F 13/1694 711/158 |
| 2006/0106950 A1 * | 5/2006 | Wang .................... G06F 3/0613 710/5 |
| 2011/0161607 A1 * | 6/2011 | Nomura ................ G06F 3/0613 711/162 |

\* cited by examiner

*Primary Examiner* — Midys Rojas
*Assistant Examiner* — Tracy A Warren
(74) *Attorney, Agent, or Firm* — Muncy, Geissler, Olds & Lowe, P.C.

(57) ABSTRACT

The present invention discloses an interface transmission method including: enabling a first command string including a first sub-command to be transmitted to a storage device from a processing device during a first period; enabling a second command string including a second sub-command to be transmitted to the storage device from the processing device during a second period, wherein the first sub-command and the second sub-command constitute a command; when the command is a write command, enabling a write data string to be transmitted to the storage device from the processing device during a third period, wherein the write data string includes write data; and when the command is a read command, enabling a read data string to be transmitted to the processing device from the storage device during the third period, wherein the read data string includes read data.

6 Claims, 7 Drawing Sheets

DATA STRUCTURE PRODUCT AND METHOD FOR INTERFACE TRANSMISSION

CROSS REFERENCE TO RELATED APPLICATIONS

This application claims priority of Taiwan Patent Application No. 101143866, filed on Nov. 23, 2012, the entirety of which is incorporated by reference herein.

BACKGROUND OF THE INVENTION

Field of the Invention

The present invention relates to an interface transmission method, and in particular to an interface transmission method including transmitting a plurality of commands with a predetermined length.

Description of the Related Art

Electronic devices typically use memories to store firmware and data. For example, a flash memory and other types of non-volatile memory may be used as a memory in an electronic device. Note that different memory model types may require different operating parameters. The operating parameters include, but are not limited to, the access method, the command format, and so on. Thus, the firmware of an electronic device is usually designed to be compatible with the memory model type of the memory used in the electronic device. The firmware itself contains parameter information about the memory in operation, thus the firmware can properly access or read/write the memory.

However, the design flexibility of electronic devices is limited by the aforementioned conventional technique. For example, the electronic device may not be read or written by the original reading and writing rule after the memory of the electronic device is implemented by another memory model type, or after the electronic device is upgraded. Therefore, the user needs to update the new program code corresponding to the new version. It is difficult for the manufacturer to manage and maintain the various firmware versions.

BRIEF SUMMARY OF THE INVENTION

A detailed description is given in the following embodiments with reference to the accompanying drawings.

The present invention discloses an interface transmission method applied to a processing device and a storage device. The interface transmission method includes: enabling a first command string to be transmitted to the storage device from the processing device during a first period, wherein the first command string includes a first sub-command having a first predetermined number of bits; enabling a second command string to be transmitted to the storage device from the processing device during a second period, wherein the second command string includes a second sub-command having the first predetermined number of bits, wherein the first sub-command and the second sub-command constitute a command; when the command is a write command, enabling a write data string to be transmitted to the storage device from the processing device during a third period, wherein the write data string includes write data having a second predetermined number of bits, and the third period is scheduled after the first period and the second period; and when the command is a read command, enabling a read data string to be transmitted to the processing device from the storage device during the third period, wherein the read data string includes read data having the second predetermined number of bits.

Additionally, the present invention further discloses a data structure product arranged to be transmitted to a storage device from a processing device for reading data from or writing data to the storage device. The data structure product includes a first command string, a second command string, a write data string and a read data string. The first command string is arranged to be transmitted to the storage device from the processing device during a first period, wherein the first command string includes a first sub-command having a first predetermined number of bits. The second command string is arranged to be transmitted to the storage device from the processing device during a second period, wherein the second command string includes a second sub-command having the first predetermined number of bits, wherein the first sub-command and the second sub-command constitute a command. The write data string is arranged to be transmitted to the storage device from the processing device during a third period, wherein the write data string includes write data having a second predetermined number of bits, and the third period is scheduled after the first period and the second period. The read data string is arranged to be transmitted to the processing device from the storage device during the third period, wherein the read data string includes read data having the second predetermined number of bits.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
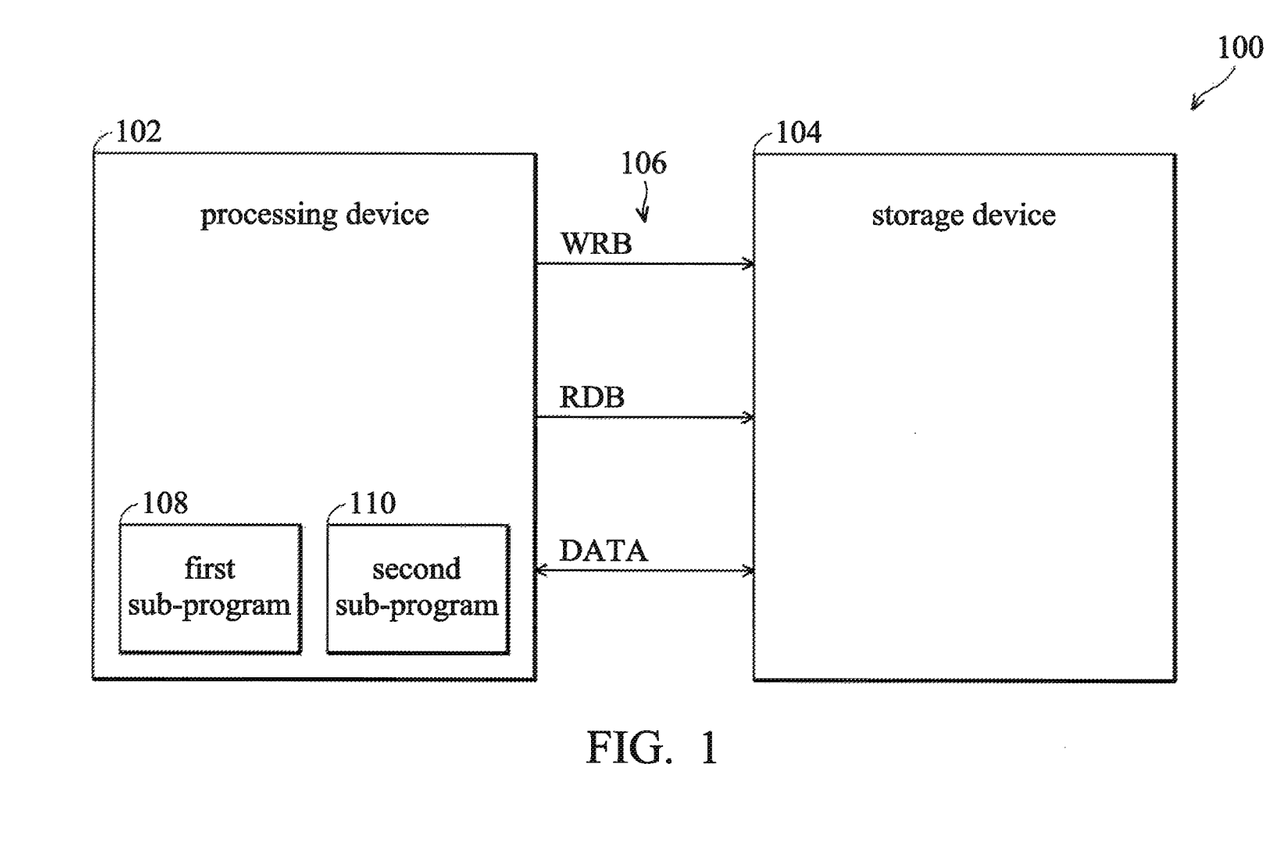
FIG. 1 is a schematic diagram illustrating an embodiment of a data transmission system of the present invention.

FIG. 1 is a schematic diagram illustrating an embodiment of a data transmission system of the present invention. The data transmission system 100 can operate in four operation modes, and the four operation modes include a write mode, a read mode, a read-write mode, and a command mode. The data transmission system 100 includes a processing device 102, a storage device 104, and a transmission interface 106.

The processing device 102 includes a first sub-program 108 and a second sub-program 110. The first sub-program 108 and the second sub-program 110 are arranged to drive the transmission interface 106 in different periods, respectively, to transmit the commands corresponding to the four operation modes to the storage device 104, and read data from or write data to the storage device 104 according to the operation modes. In one of the embodiments of the present invention, the processing device 102 can be a micro-processing device. In another embodiment of the present invention, the processing device 102 can be a processing unit including an embedded controller, a chipset, a central-processing unit (CPU) or a plurality of processing devices related to the parallel processing environment (not shown). The storage device 104 can be a read-only memory (ROM) or a buffer arranged to store data or program codes. Furthermore, the storage device 104 can be also arranged to determine the operation modes according to a command produced by the processing device 102, and transmit and/or receive data according to the operation mode determined by the command. In one of the embodiments of the present invention, the storage device 104 can be applied to a driving controller (not shown) of a display device (not shown), and arranged to store program codes and/or image data, but it is not limited thereto. In other embodiments, the storage device 104 can be implemented in other controllers which are able to calculate data.

The transmission interface 106 includes a write clock WRB, a read clock RDB and a data line DATA, wherein the data line DATA is arranged to transmit data according to the rule of the data structure product provided by the present invention. In another embodiment of the present invention, the transmission interface 106 further includes a chip select line (not shown) arranged to enable the storage device 104, but it is not limited thereto. The write clock WRB and the read clock RDB are arranged to be provided to the storage device 104. The data line DATA is arranged to transmit data between the processing device 102 and the storage device 104.

Figure 2:
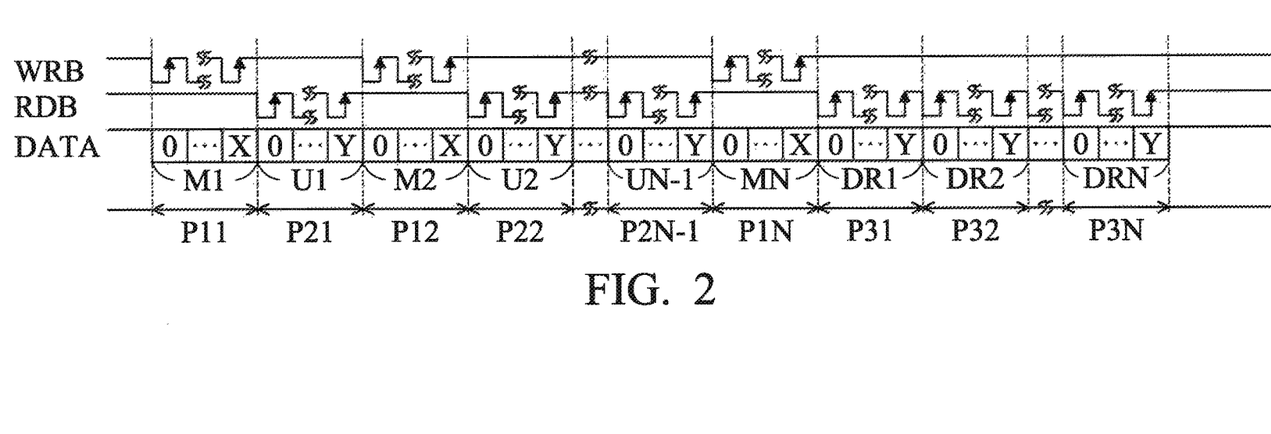
FIG. 2 is a signal diagram illustrating an embodiment of a read mode of the present invention.

FIG. 2 is a signal diagram illustrating an embodiment of a read mode of the present invention. When the data transmission system 100 operates in the read mode, the first sub-program 108 of the processing device 102 is arranged to divide a read command into at least one command string M1~MN. The first sub-program 108 of the processing device 102 is further arranged to enable the command strings M1~MN to be transmitted to the storage device 104 according to the write clock WRB. It should be noted that each of command strings M1~MN includes a sub-command having a first predetermined number of bits, wherein the first predetermined number of bits is X. Moreover, the second sub-program 110 of the processing device 102 is further arranged to enable the storage device 104 to transmit at least one undefined data string U1~UN-1 and at least one read data string DR1~DRN to the processing device 102 and receive the undefined data strings U1~UN-1 and the read data strings DR1~DRN according to the read clock RDB. It should be noted that each of the undefined data strings U1~UN-1 has undefined data having a second predetermined number of bits, and each of the read data strings DR1~DRN has read data having the second predetermined number of bits, respectively, wherein the second predetermined number of bits is Y. Moreover, in one of the embodiments of the present invention, the undefined data is invalid data. FIG. 2 includes at least one period P11~P1N, at least one period P21~P2N-1 and at least one period P31~P3N, wherein each of the periods P21~P2N-1 are scheduled between two of the periods P11~P1N, and the periods P31~P3N are scheduled after the periods P11~P1N and the periods P21~P2 N-1.

As shown in FIG. 2, the write clock WRB is arranged to toggle for a first predetermined number of times during the periods P11~P1N, respectively, and keep at a predetermined voltage level during the periods P21~P2N-1 and the periods P31~P3N, wherein the first predetermined number of times is X, which is the same as the first predetermined number of bits, and the X is greater than 2. It should be noted that the predetermined voltage level can be a high voltage level or a low voltage level, but it is not limited thereto. The read clock RDB is arranged to toggle for a second predetermined number of times during the periods P21~P2N-1 and the periods P31~P3N, and keep at a predetermined voltage level during the period(s) P11~P1N, wherein the second predetermined number of times is Y, which is the same as the second predetermined number of bits, and Y is greater than 2. It should be noted that, in the present invention, X can be either equal to Y or different with Y, but it is not limited thereto.

For example, when the data transmission system 100 operates in the read mode, the first sub-program 108 of the processing device 102 is arranged to divide a read command into the command strings M1~M2 according to the length of the read command. The command string M1 is arranged to be transmitted to the storage device 104 from the processing device 102 according to the write clock WRB during the period P11. The command string M2 is arranged to be transmitted to the storage device 104 from the processing device 102 according to the write clock WRB during the period P12. The undefined data string U1 is arranged to be transmitted to the processing device 102 from the storage device 104 according to the read clock RDB during the period P21, wherein the period P21 is scheduled between the period P11 and the period P12. The read data string DR1 is arranged to be transmitted to the processing device 102 from the storage device 104 during the period P31. In other embodiments, the first sub-program 108 of the processing device 102 is arranged to divide a read command into three command strings M1~M3 or four command strings M1~M4 according to the length of the read command. Moreover, when the quantity of the data required by the processing device 102 is greater than Y, which is the second predetermined number of bits, the storage device 104 can divide the data into a plurality of read data strings DR1~DRN, and transmit the read data strings DR1 ~DRN to the processing device 102 in the periods P31~P3N, respectively. It should be noted that, in another embodiment of the present invention, the second sub-program 110 can disable the undefined data strings U1~UN-1 to be transmitted to the processing device 102. Namely, in another embodiment, FIG. 2 does not include the periods P21~P2N-1.

Figure 3:
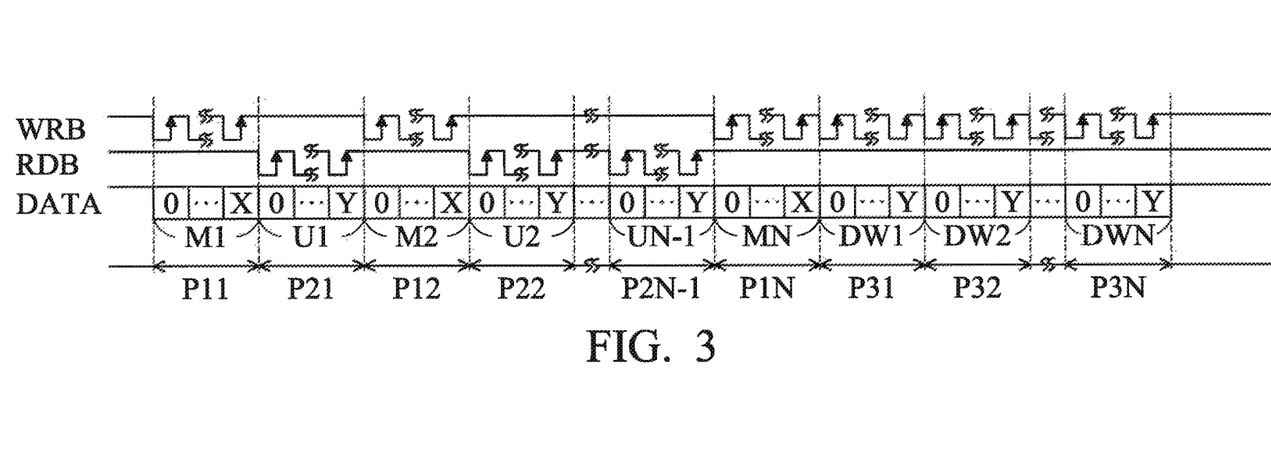
FIG. 3 is a signal diagram illustrating an embodiment of a write mode of the present invention.

FIG. 3 is a signal diagram illustrating an embodiment of a write mode of the present invention. When the data transmission system 100 operates in the write mode, the first sub-program 108 of the processing device 102 is arranged to divide a write command into at least one command string M1~MN, and enable the command strings M1~MN to be transmitted to the storage device 104 according to the write clock WRB. Next, the first sub-program 108 is further arranged to transmit at least one write data string DW1~DWN to the storage device 104 according to the write clock WRB. It should be noted that each of the command strings M1~MN includes a sub-command having the first predetermined number of bits, and each of the write data strings DW1~DWN includes write data having the second predetermined number of bits, wherein the first predetermined number of bits is X, and the second predetermined number of bits is Y. Moreover, the second sub-program 110 of the processing device 102 is further arranged to enable the storage device 104 to transmit the undefined data string(s) U1~UN-1 to the processing device 102 and receive the undefined data strings U1~UN-1 according to the read clock RDB. It should be noted that each of the undefined data strings U1~UN-1 includes the undefined data having the second predetermined number of bits. Moreover, in one of the embodiments of the present invention, the undefined data is invalid data. FIG. 3 includes at least one period P11~P1N, at least one period P21~P2N-1, and at least one period P31~P3N, wherein each of the periods P21~P2N-1 are scheduled between two of the periods P11~P1N and the periods P31~P3N are scheduled after the periods P11~P1N and the periods P21~P2N-1.

As FIG. 3 shows, the write clock WRB is arranged to toggle for a first predetermined number of times during the periods P11~P1N, respectively, and toggle for a second predetermined number of times during the periods P31~P3N, respectively, and keep at a predetermined voltage level during the periods P21~P2N-1. The first number of times is X, which is the same as the first predetermined number of bits, and X is greater than 2. The second predetermined number of times is Y, which is the same as the second predetermined number of bits, and Y is greater than 2. It should be noted that the predetermined voltage level can be a high voltage level or a low voltage level, but it is not limited thereto. The read clock RDB is arranged to toggle for the second predetermined number of times during the periods P21~P2N-1, and keep at a predetermined voltage level during the periods P11~P1N and the periods P31~P3N. It should be noted that, in the present invention, X can be either equal to Y or different with Y, but it is not limited thereto.

For example, when the data transmission system 100 operates in the write mode, the first sub-program 108 of the processing device 102 is arranged to divide a write command into the command strings M1~M2 according to the length of the write command. The command string M1 is arranged to be transmitted to the storage device 104 from the processing device 102 according to the write clock WRB during the period P11. The command string M2 is arranged to be transmitted to the storage device 104 from the processing device 102 according to the write clock WRB during the period P12. The undefined data string U1 is arranged to be transmitted to the processing device 102 from the storage device 104 according to the read clock RDB during the period P21, wherein the period P21 is scheduled between the period P11 and the period P12. The write data string DW1 is arranged to be transmitted to the storage device 104 from the processing device 102 during the period P31. In other embodiments, the first sub-program 108 of the processing device 102 is arranged to divide a write command into three command strings M1~M3 or four command strings M1~M4 according to the length of the write command. Moreover, when the quantity of the data arranged to be n into the storage device 104 required by the processing device 102 is greater than Y, which is the same as the second predetermined number of bits, the processing device 102 can divide the data into a plurality of write data strings DW1~DWN, and transmit the write data strings DW1~DWN to the storage device 104 in periods P41~P4N. It should be noted that, in another embodiment, the second sub-program 110 can disable the undefined data strings U1~UN-1 to be transmitted to the processing device 102. Namely, in another embodiment, FIG. 3 does not include the periods P21~P2N-1.

Figure 4:
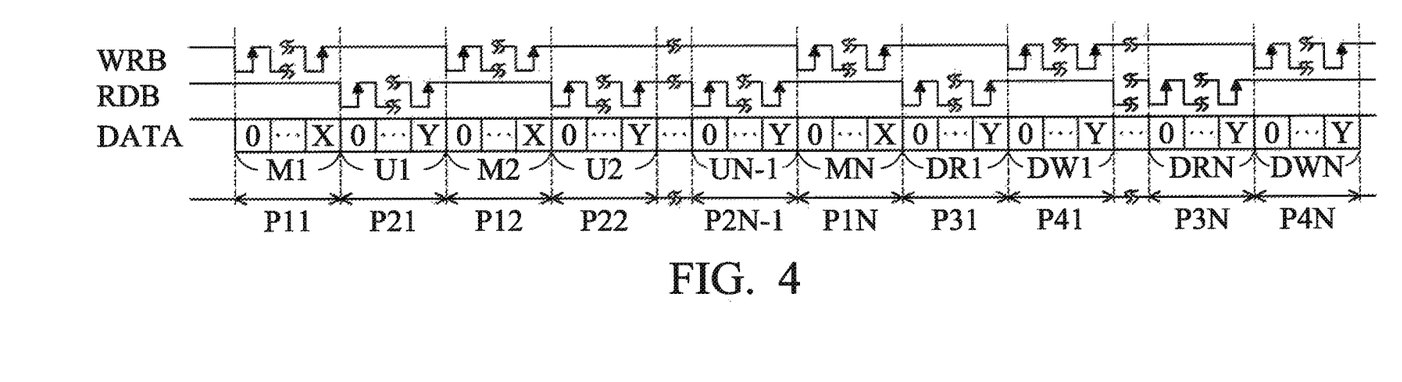
FIG. 4 is a signal diagram illustrating an embodiment of a read-write mode of the present invention.

FIG. 4 is a signal diagram illustrating an embodiment of a read-write mode of the present invention. When the data transmission system 100 operates in the read-write mode, the first sub-program 108 of the processing device 102 is arranged to divide a read-write command into at least one command string M1~MN, and enable the command strings M1~MN to be transmitted to the storage device 104 according to the write clock WRB. Next, the first sub-program 108 is further arranged to transmit t least one write data string DW1~DWN to the storage device 104 according to the write clock WRB. It should be noted that each of the command strings M1~MN includes a sub-command having the first predetermined number of bits, and each of the write data strings DW1~DWN includes write data having the second predetermined number of bits, wherein the first predetermined number of bits is X, and the second predetermined number of bits is Y. Moreover, the second sub-program 110 of the processing device 102 is further arranged to enable the storage device 104 to transmit the undefined data string(s) U1~UN-1 and the read data string(s) DR1~DRN to the processing device 102 and receive the undefined data strings U1~UN-1 and the read data strings DR1~DRN according to the read clock RDB. It should be noted that each of the undefined data strings U1~UN-1 includes undefined data having the second predetermined number of bits, and each of the read data strings DR1~DRN includes read data having the second predetermined number of bits, respectively. Moreover, in one of the embodiments of the present invention, the undefined data is invalid data. FIG. 4 includes at least one period P11~P1N, at least one period P21~P2N-1, at least one period P31~P3N and at least one period P41~P4N, wherein each of the periods P21~P2N-1 are scheduled between two of the periods P11~P1N, and the periods P31~P3N are scheduled after the periods P11~P1N and the periods P21~P2N-1. Moreover, each of the periods P41~P4N are scheduled between two of the periods P31~P3N.

As shown in FIG. 4, the write clock WRB is arranged to toggle for a first predetermined number of times during the periods P11~P1N, respectively, and toggle for a second predetermined number of times during the periods P41~P4N, respectively, and keep at a predetermined voltage level during the periods P21~P2N-1 and the periods P31~P3N. The first predetermined number of times is X, which is the same as the first predetermined number of bits, and X is greater than 2. The second predetermined number of times is Y, which is the same as the second predetermined number of bits, and Y is greater than 2. It should be noted that the predetermined voltage level can be a high voltage level or a low voltage level, but it is not limited thereto. The read clock RDB is arranged to toggle for the second predetermined number of times during the periods P21~P2N-1 and the periods P31~P3N, and keep at a predetermined voltage level during the periods P11~P1N and the periods P41~P4N. It should be noted that, in the present invention, X can be either equal to Y or different with Y, but it is not limited thereto.

For example, when the data transmission system 100 operates in read-write mode, the first sub-program 108 of the processing device 102 is arranged to divide a read-write command into the command strings M1~M2 according to the length of the read-write command. The command string M1 is arranged to be transmitted to the storage device 104 from the processing device 102 according to the write clock WRB during the period P11. The command string M2 is arranged to be transmitted to the storage device 104 from the processing device 102 according to the write clock WRB during the period P12. The undefined data string U1 is arranged to be transmitted to the processing device 102 from the storage device 104 according to the read clock RDB during the period P21, wherein the period P21 is scheduled between the period P11 and the period P12. The read data string DR1 is arranged to be transmitted to the processing device 102 from the storage device 104 during the period P31. The write data string DW1 is arranged to be transmitted to the storage device 104 from the processing device 102 during the period P41. In other embodiments, the first sub-program 108 of the processing device 102 is arranged to divide a read-write command into three command strings M1~M3 or four command strings M1~M4 according to the length of the read-write command. Moreover, when the quantity of the data required by the processing device 102 is greater than Y, which is the same as the second predetermined number of bits, the storage device 104 can divide the data into a plurality of read data strings DR1~DRN, and transmit the read data strings DR1~DRN to the processing device 102 in the periods P31~P3N, respectively. When the quantity of the data arranged to be written into the storage device 104 required by the processing device 102 is greater than Y, which is the same as the second predetermined number of bits, the processing device 102 can divide the data into a plurality of write data strings DW1~DWN, and transmit the write data strings DW1~DWN to the storage device 104 in periods P41~P4N, respectively. It should be noted that, in another embodiment, the second sub-program 110 can disable the undefined data strings U1~UN-1 to be transmitted to the processing device 102. Namely, in another embodiment, FIG. 5 does not include the periods P21~P2N-1.

In another embodiment of the present invention (not shown), when the data transmission system 100 operates in read-write mode, the write clock WRB is arranged to toggle for a first predetermined number of times during the periods P11~P1N, respectively, and toggle for a second predetermined number of times during the periods P31~P3N, respectively, and keep at a predetermined voltage level during the periods P21~P2N-1 and the periods P41~P4N. The read clock RDB is arranged to toggle for the second predetermined number of times during the periods P21~P2N-1 and the periods P41~P4N, respectively, and keep at a predetermined voltage level during the periods P11~P1N and the periods P31~P3N.

For example, when the data transmission system 100 operates in read-write mode, the first sub-program 108 of the processing device 102 is arranged to divide a read-write command into the command strings M1~M2 according to the length of the read-write command. The command string M1 is arranged to be transmitted to the storage device 104 from the processing device 102 according to the write clock WRB during the period P11. The command string M2 is arranged to be transmitted to the storage device 104 from the processing device 102 according to the write clock WRB during the period P12. The undefined data string U1 is arranged to be transmitted to the processing device 102 from the storage device 104 according to the read clock RDB during the period P21. The read data string DR1 is arranged to be transmitted to the processing device 102 from the storage device 104 during the period P41. The write data string DW1 is arranged to be transmitted to the storage device 104 from the processing device 102 during the period P31.

Figure 5:
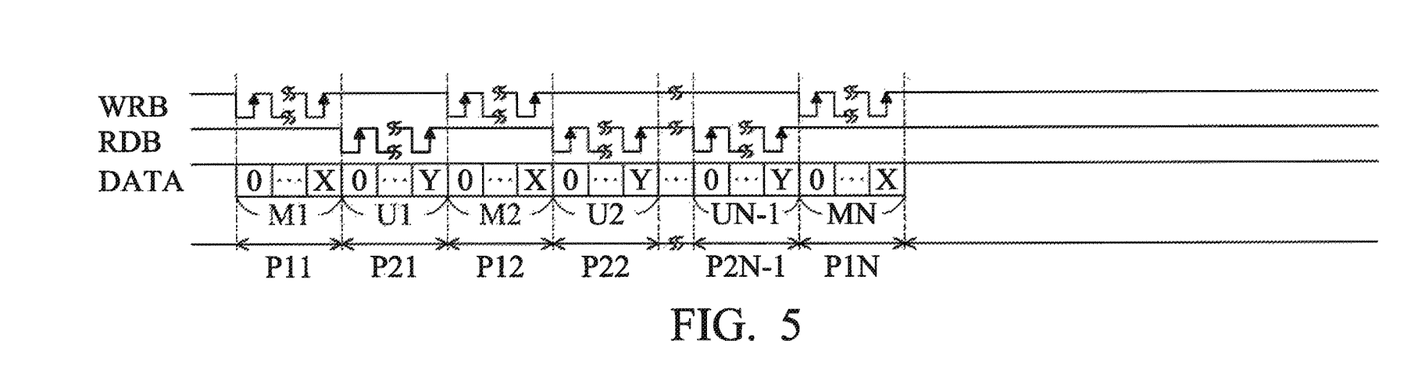
FIG. 5 is a signal diagram illustrating an embodiment of a command mode of the present invention.

FIG. 5 is a signal diagram illustrating an embodiment of a command mode of the present invention. When the data transmission system 100 operates in the command mode, the first sub-program 108 of the processing device 102 is arranged to divide a into at least one command string M1~MN, and enable the command strings M1~MN to be transmitted to the storage device 104 according to the write clock WRB. It should be noted that each of the command strings M1~MN includes a sub-command having the first predetermined number of bits, wherein the first predetermined number of bits is X. Moreover, the second sub-program 110 of the processing device 102 is further arranged to enable the storage device 104 to transmit the undefined data string(s) U1~UN-1 to the processing device 102 and receive the undefined data strings U1~UN-1 according to the read clock RDB. It should be noted that each of the undefined data strings U1~UN-1 includes the undefined data having the second predetermined number of bits. Moreover, in one of the embodiments of the present invention, the undefined data is invalid data. FIG. 5 includes at least one period P11~P1N and at least one period P21~P2N-1, wherein each of the periods P21~P2N-1 are scheduled between two of the periods P11~P1N.

As shown in FIG. 5, the write clock WRB is arranged to toggle for a first predetermined number of times during the periods P11~P1N, and keep at a predetermined voltage level during the periods P21~P2N-1. The first predetermined number of times is X, which is the same as the first predetermined number of bits, and X is greater than 2. It should be noted that the predetermined voltage level can be a high voltage level or a low voltage level, but it is not limited thereto. The read clock RDB is arranged to toggle for the second predetermined number of times during the periods P21~P2N-1, and keep at a predetermined voltage level during the periods P11~P1N. The second predetermined number of times is Y, which is the same as the second predetermined number of bits, and Y is greater than 2. It should be noted that, in the present invention, X can be either equal to Y or different with Y, but it is not limited thereto.

For example, when the data transmission system 100 operates in the command mode, the first sub-program 108 of the processing device 102 is arranged to divide a command into the command strings M1~M2 according to the length of the command. The command string M1 is arranged to be transmitted to the storage device 104 from the processing device 102 according to the write clock WRB during the period P11. The command string M2 is arranged to be transmitted to the storage device 104 from the processing device 102 according to the write clock WRB during the period P12. The undefined data string U1 is arranged to be transmitted to the processing device 102 from the storage device 104 according to the read clock RDB during the period P21, wherein the period P21 is scheduled between the period P11 and the period P12. In other embodiments, the first sub-program 108 of the processing device 102 is arranged to divide a command into three command strings M1~M3 or four command strings M1~M4 according to the length of the command, etc. It should be noted that, in another embodiment, the second sub-program 110 can disable the undefined data strings U1~UN-1 to be transmitted to the processing device 102. Namely, in another embodiment, FIG. 5 does not include the periods P21~P2N-1.

Figure 6:
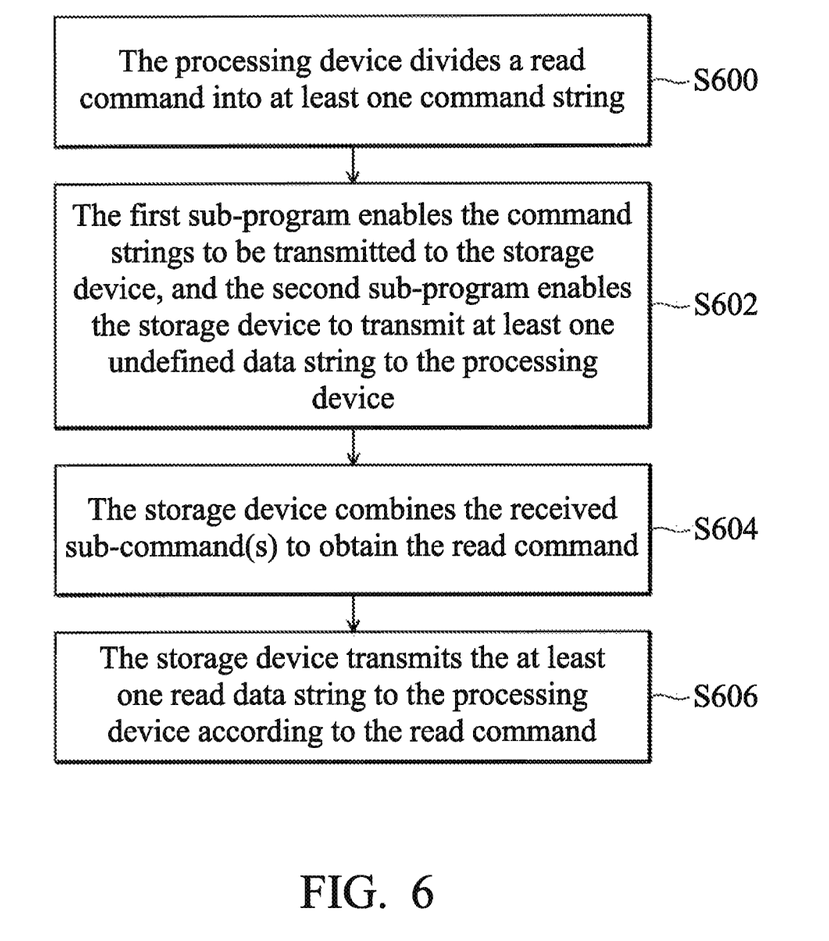
FIG. 6 is a flowchart of an interface transmission method according to an embodiment of the present invention.

FIG. 6 is a flowchart of an interface transmission method according to an embodiment of the present invention. The interface transmission method is applied to a processing device 102 and a storage device 104 of a data transmission system 100, wherein the data transmission system operates in a read mode. The process starts at step S600.

In step S600, the first sub-program 108 of the processing device 102 is arranged to divide a read command into at least one command string M1~MN. It should be noted that each of the command strings M1~MN includes a sub-command having a first predetermined number of bits, wherein the first predetermined number of bits is X.

Next, in step S602, the first sub-program 108 of the processing device 102 is arranged to enable the command strings M1~MN to be transmitted to the storage device 104 during the periods P11~P1N, respectively, according to the write clock WRB. Moreover, the second sub-program 110 of the processing device 102 is further arranged to enable the storage device 104 to transmit at least one undefined data string U1~UN-1 to the processing device 102 from the storage device 104 and receive the undefined data strings U1~UN-1 during at least one period P21~P2N-1, respectively, according to the read clock RDB, wherein each of the periods P21~P2N-1 are scheduled between two of the periods P11~P1N. It should be noted that each of the defined data strings U1~UN-1 has an undefined data having a second predetermined number of bits, wherein the second predetermined number of bits is Y.

For example, in FIG. 2, the write clock WRB is arranged to toggle for a first predetermined number of times during the periods P11~P1N, respectively, wherein the first predetermined number of times is X, which is the same as the first predetermined number of bits, and the X is greater than 2. The read clock RDB is arranged to toggle for a second predetermined number of times during the periods P21~P2N-1, wherein the second predetermined number of times is Y, which is the same as the second predetermined number of bits, and Y is greater than 2. It should be noted that, in the present invention, X can be either equal to Y or different with Y, but it is not limited thereto.

When the first sub-program 108 of the processing device 102 is arranged to divide the read command into the command strings M1~M2, the command string M1 is arranged to be transmitted to the storage device 104 from the processing device 102 according to the write clock WRB during the period P11. The command string M2 is arranged to be transmitted to the storage device 104 from the processing device 102 according to the write clock WRB during the period P12. The undefined data string U1 is arranged to be transmitted to the processing device 102 from the storage device 104 according to the read clock RDB during the period P21, wherein the period P21 is scheduled between the period P11 and the period P12. In other embodiments, the first sub-program 108 of the processing device 102 is arranged to divide a read command into three command strings M1~M3 or four command strings M1~M4 according to the length of the read command. Moreover, in one embodiment of the present invention, the undefined data is invalid data. Namely, the processing device 102 can ignore the received undefined data. It should be noted that, in another embodiment of the present invention, the second sub-program 110 can disable the undefined data strings U1~UN-1 to be transmitted to the processing device 102. Namely, in another embodiment, periods P21~P2N-1 do not exist.

Next, in step S604, the storage device 104 is arranged to combine the received sub-command(s) to obtain the read command. For example, when the storage device 104 receives two command strings M1~M2, the storage device 104 combines the sub-commands of the received command strings M1~M2 to obtain the read command. In other embodiments, the storage device 104 is further arranged to receive three command strings M1~M3 or four command strings M1~M4, and combine the sub-commands of the received command string, but it is not limited thereto.

Next, in step S606, the storage device 104 transmits the read data string(s) DR1~DRN to the processing device 102 according to the read command and the read clock RDB provided by the processing device 102 in the period(s) P31~P3N. The process ends at step S606. It should be noted that each of the read data strings DR1~DRN has read data having the second predetermined number of bits, respectively, wherein the second predetermined number of bits is Y.

For example, in FIG. 2, the read clock RDB is arranged to toggle for a second predetermined number of times during the periods P31~P3N, respectively, wherein the second predetermined number of times is Y, which is the same as the second predetermined number of bits, and Y is greater than 2. For example, when the quantity of the data required by the processing device 102 is less than Y, which is the same as the second predetermined number of bits, the read data string DR1 is arranged to be transmitted to the processing device 102 from the storage device 104 during the period P31 according to the read clock RDB. Moreover, when the quantity of the data required by the processing device 102 is greater than Y, which is the same as the second predetermined number of bits, the storage device 104 is arranged to divide the data into a plurality of read data strings DR1~DRN, and transmit the read data strings DR1~DRN during the periods P31~P3N, respectively.

Figure 7:
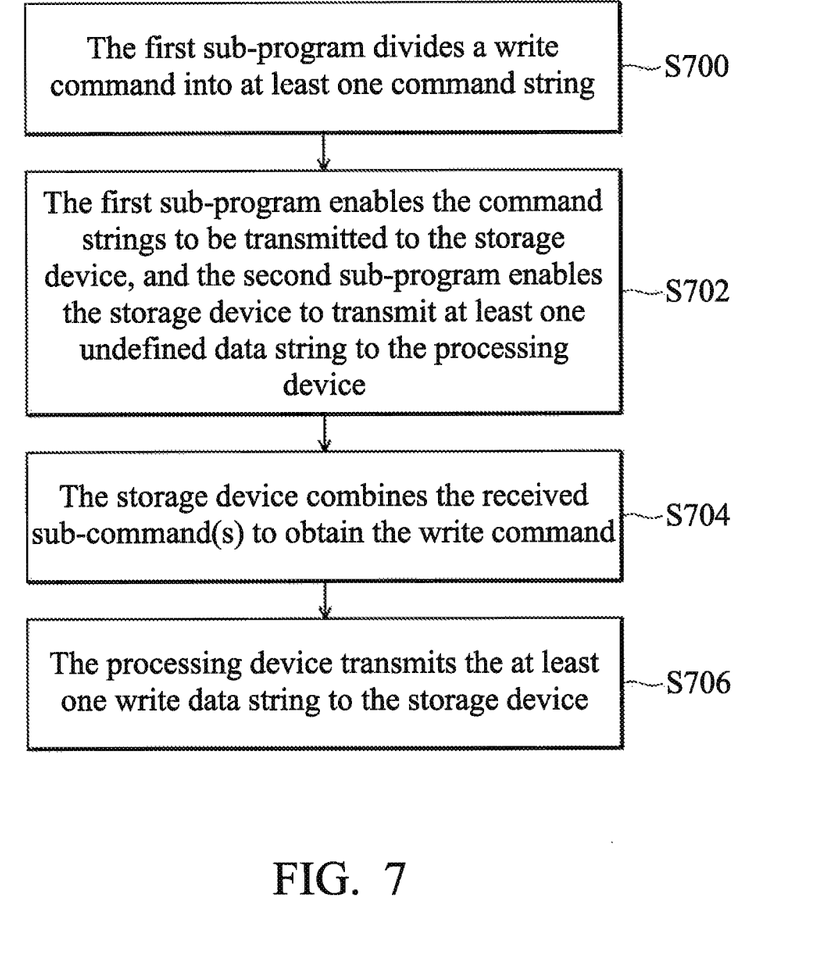
FIG. 7 is a flowchart of an interface transmission method according to another embodiment of the present invention.

FIG. 7 is a flowchart of an interface transmission method according to another embodiment of the present invention. The interface transmission method is applied to a processing device 102 and a storage device 104 of a data transmission system 100, wherein the data transmission system operates in a write mode. The process starts at step S700. It should be noted that step S702 is similar to step S602 of FIG. 6. Reference may be made to FIG. 6 for the description of the features of step S702.

In step S700, the first sub-program 108 of the processing device 102 is arranged to divide a write command into at least one command string M1~MN. It should be noted that each of the command strings M1~MN includes a sub-command having the first predetermined number of bits, wherein the first predetermined number of bits is X.

In step S704, the storage device 104 is arranged to combine the received sub-command(s) to obtain the write command. For example, when the storage device 104 receives two command strings M1~M2, the storage device 104 combines the sub-commands of the received command strings M1~M2 to obtain the write command. In other embodiments, the storage device 104 is further arranged to receive three command strings M1~M3 or four command strings M1~M4, and combine the sub-commands of the received command string, but it is not limited thereto.

Next, in step S706, the first sub-program 108 of the processing device 102 is arranged to transmit the write data string(s) DW1~DWN to the storage device 104 during the period(s) P31~P3N according to the write clock WRB. The process ends at step S706. It should be noted that each of the write data strings DW1~DWN includes write data having the second predetermined number of bits, wherein the second predetermined number of bits is Y.

For example, in FIG. 3, the write clock WRB is arranged to toggle for a second predetermined number of times during the periods P31~P3N, respectively, wherein the second predetermined number of times is Y, which is the same as the second predetermined number of bits, and Y is greater than 2. For example, when the quantity of the data arranged to be written the storage device 104 required by the processing device 102 is less than Y, which is the same as the second predetermined number of bits, the write data string DW1 is arranged to be transmitted to the storage device 104 from the processing device 102 according to the write clock WRB during the period P31. Moreover, when the quantity of the data arranged to be written into the storage device 104 required by the processing device 102 is greater than Y, which is the same as the second predetermined number of bits, the processing device 102 is arranged to divide the data into a plurality of write data strings DW1~DWN, and transmit the write data strings DW1~DWN to the storage device 104 during the periods P31~P3N, respectively.

Figure 8:
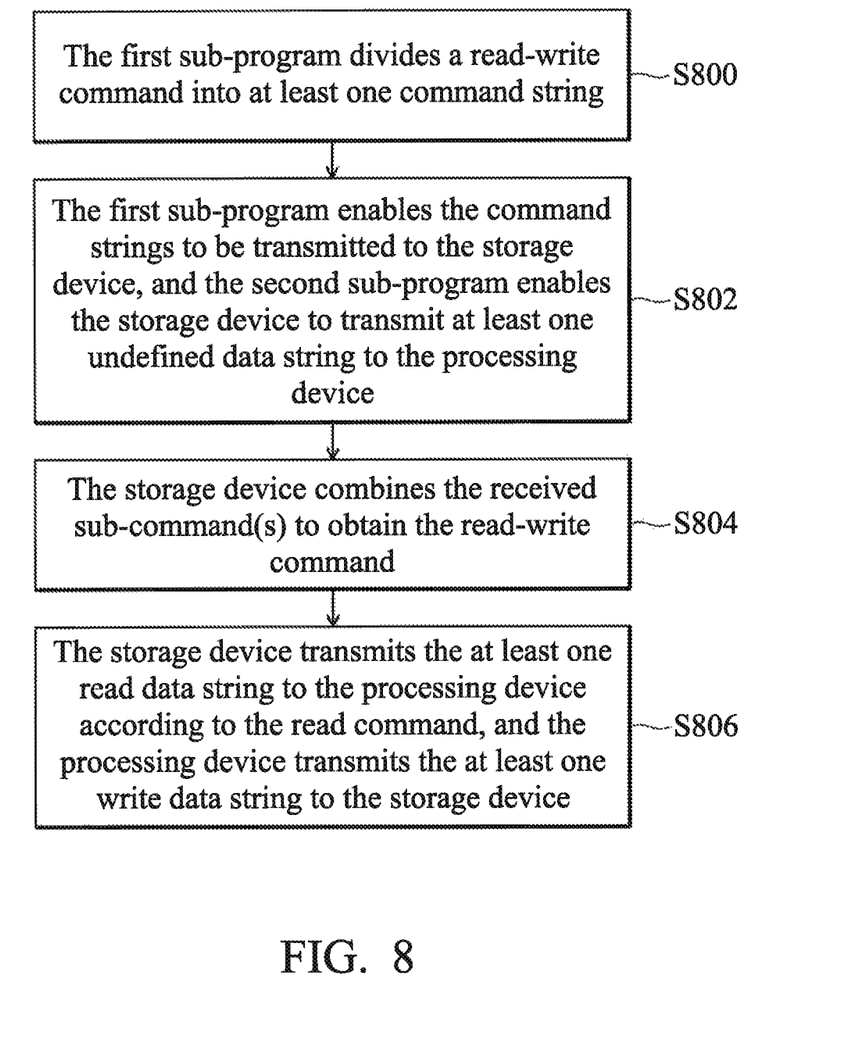
FIG. 8 is a flowchart of an interface transmission method according to another embodiment of the present invention.

FIG. 8 is a flowchart of an interface transmission method according to another embodiment of the present invention. The interface transmission method is applied to a processing device 102 and a storage device 104 of a data transmission system 100, wherein the data transmission system operates in a read-write mode. The process starts at step S800. It should be noted that step S802 is similar to step S602 of FIG. 6. Reference may be made to FIG. 6 for the description of the features of step S802.

In step S800, the first sub-program 108 of the processing device 102 is arranged to divide a read-write command into at least one command string M1~MN. It should be noted that each of the command strings M1~MN includes a sub-command having the first predetermined number of bits, wherein the first predetermined number of bits is X.

In step S804, the storage device 104 is arranged to combine the received sub-command(s) to obtain the read-write command. For example, when the storage device 104 receives two command strings M1~M2, the storage device 104 combines the sub-commands of the received command strings M1~M2 to obtain the read-write command. In other embodiments, the storage device 104 is further arranged to receive three command strings M1~M3 or four command strings M1~M4, and combine the sub-commands of the received command string, but it is not limited thereto.

Next, in step S806, the storage device 104 transmits the read data string(s) DR1~DRN to the processing device 102 during the period(s) P31~P3N according to the read command and the read clock RDB provided by the processing device 102. Moreover, the first sub-program 108 of the processing device 102 is arranged to transmit the write data string(s) DW1~DWN to the storage device 104 during the period(s) P41~P4N. The process ends at step S806. It should be noted that each of the write data strings DW1 ~DWN includes write data having the second predetermined number of bits, wherein the second predetermined number of bits is Y.

For example, in FIG. 7, the read clock RDB is arranged to toggle for a second predetermined number of times during the periods P31~P3N, wherein the second predetermined number of times is Y, which is the same as the second predetermined number of bits, and Y is greater than 2. The write clock WRB is arranged to toggle for a second predetermined number of times during the periods P41~P4N, respectively. For example, when the quantity of the data required by the processing device 102 is less than Y, which is the same as the second predetermined number of bits, the read data string DR1 is arranged to be transmitted to the processing device 102 from the storage device 104 during the period P31 according to the read clock RDB. Moreover, when the quantity of the data arranged to be written into the storage device 104 required by the processing device 102 is less than Y, which is the same as the second predetermined number of bits, the write data string DW1 is arranged to be transmitted to the storage device 104 from the processing device 102 according to the write clock WRB during the period P41. In another embodiment, when the quantity of the data required by the processing device 102 is greater than Y, which is the same as the second predetermined number of bits, the storage device 104 is arranged to divide the data into a plurality of read data strings DR1~DRN, and transmit the read data strings DR1~DRN to the processing device 102 during the periods P31~P3N, respectively. When the quantity of the data arranged to be written into the storage device 104 required by the processing device 102 is greater than Y, which is the same as the second predetermined number of bits, the processing device 102 is arranged to divide the data into a plurality of write data strings DW1~DWN, and transmit the write data strings DW1~DWN to the storage device 104 during the periods P41~P4N, respectively.

In another embodiment of the present invention, the storage device 104 is arranged to transmit the read data string(s) DR1~DRN to the processing device 102 according to the read command and the read clock RDB provided by the processing device 102 during the period(s) P41~P4N. Moreover, the first sub-program 108 of the processing device 102 is arranged to transmit the write data string(s) DW 1~DWN to the storage device 104 during the period(s) P31~P3N according to the write clock WRB. For example, the read clock RDB is arranged to toggle for the second predetermined number of times during the periods P41~P4N. The write clock WRB is arranged to toggle for the second predetermined number of times during the periods P31~P3N, respectively. When the quantity of the data required by the processing device 102 is less than Y, which is the same as the second predetermined number of bits, the read data string DR1 is arranged to be transmitted to the processing device 102 from the storage device 104 during the period P41 according to the read clock RDB. When the quantity of the data arranged to be written into the storage device 104 required by the processing device 102 is less than Y, which is the same as the second predetermined number of bits, the write data string DW1 is arranged to be transmitted to the storage device 104 from the processing device 102 during the period P31 according to the write clock WRB. In other embodiments of the present invention, when the quantity of the data required by the processing device 102 is greater than Y, which is the same as the second predetermined number of bits, the storage device 104 is arranged to divide the data into a plurality of read data strings DR1~DRN, and transmit the read data strings DR1~DRN to the processing device 102 during the periods P41~P4N, respectively. When the quantity of the data arranged to be written into the storage device 104 required by the processing device 102 is greater than Y, which is the same as the second predetermined number of bits, the processing device 102 is arranged to divide the data into a plurality of write data strings DW1~DWN, and transmit the write data strings DW1~DWN to the storage device 104 during the periods P31~P3N, respectively.

Figure 9:
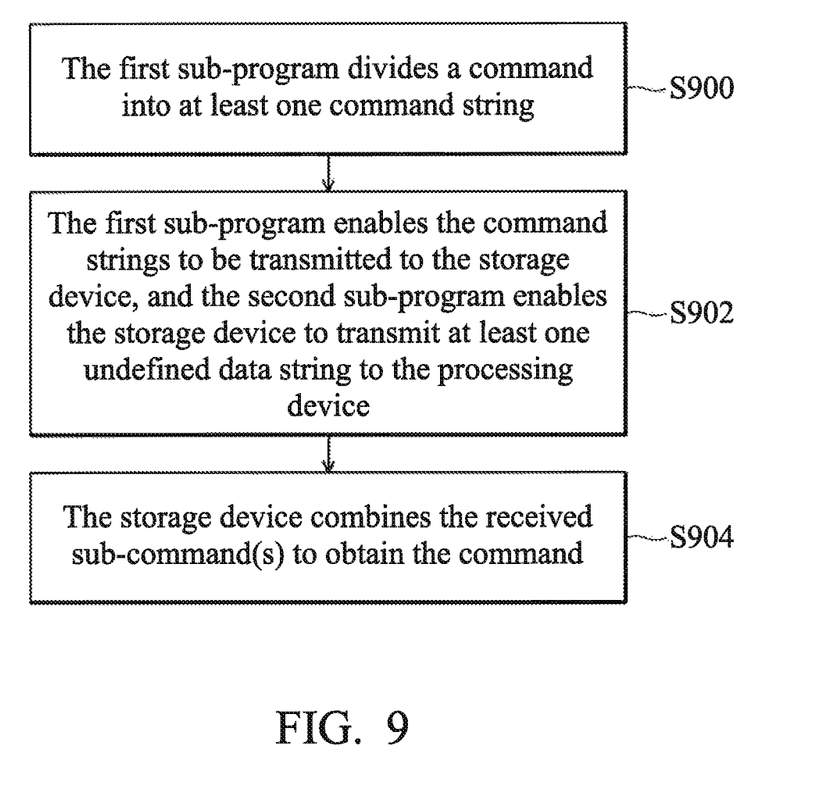
FIG. 9 is a flowchart of an interface transmission method according to another embodiment of the present invention.

FIG. 9 is a flowchart of an interface transmission method according to another embodiment of the present invention. The interface transmission method is applied to a processing device 102 and a storage device 104 of a data transmission system 100, wherein the data transmission system operates in a command mode. The process starts at step S900. It should be noted that step S902 is similar to step S602 of FIG. 6. Reference may be made to FIG. 6 for the description of the features of step S902.

In step S900, the first sub-program 108 of the processing device 102 is arranged to divide a command into at least one command string M1~MN. It should be noted that each of the command strings M1~MN includes a sub-command having the first predetermined number of bits, wherein the first predetermined number of bits is X.

In step S904, the storage device 104 is arranged to combine the received sub-command(s) to obtain the command. Next, the storage device 104 executes the combined command. For example, when the storage device 104 receives two command strings M1~M2, the storage device 104 combines the sub-commands of the received command strings M1~M2 to obtain the command. In other embodiments, the storage device 104 is further arranged to receive three command strings M1~M3 or four command strings M1~M4, and combine the sub-commands of the received command string. The process ends at step S904.

The interface transmission method and the data structure product provided by the present invention provide a plurality of command strings M1~MN having a predetermined length. Therefore, when the length of the data which is required to be provided to the storage device 104 by the user is greater than the predetermined length, the user just has to call the first sub-program 108 of the processing device 102 again, such that the rest of the command can be transmitted to the storage device 104 by the next command string. Furthermore, the user does not need to re-write the program code when the length of the new command is greater than the original predetermined length.

Data transmission methods, or certain aspects or portions thereof, may take the form of a program code (i.e., executable instructions) embodied in tangible media, such as floppy diskettes, CD-ROMS, hard drives, or any other machine-readable storage medium, wherein, when the program code is loaded into and executed by a machine, such as a computer, the machine thereby becomes an apparatus for practicing the methods. The methods may also be embodied in the form of a program code transmitted over some transmission medium, such as electrical wiring or cabling, through fiber optics, or via any other form of transmission, wherein, when the program code is received and loaded into and executed by a machine, such as a computer, the machine becomes an apparatus for practicing the disclosed methods. When implemented on a general-purpose processor, the program code combines with the processor to provide a unique apparatus that operates analogously to application-specific logic circuits.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An interface transmission method, applied to a processing device and a storage device, comprising:
dividing a plurality bits of a command into a first set of bits and a second set of bits, by the processing device before executing the command, a first number of bits of the first set of bits is equal to a first predetermined number of bits, and a second number of bits of the second set of bits is also equal to the predetermined number of bits, the first set of bits is a first command string and the second set of bits is a second command string, wherein the command, the first command string, and the second command string only comprise command bits and do not comprise data bits, the first command string and the second command string can only be executed when the first command string and the second command string are combined into the command;
during a first period before executing the command, transmitting the first command string through a data line in serial transmission to the storage device by the processing device;
during a second period before executing the command, transmitting the second command string through the data line in serial transmission to the storage device by the processing device;
obtaining the command by combining the first command string and the second command string by the storage device; and
during a third period while executing the command, transmitting a write data string to the storage device by the processing device when the command is a write command, and transmitting a read data string to the processing device by the storage device when the command is a read command,
wherein the write data string comprises write data, the write data is data bits and the number of the write data is equal to a second predetermined number of bits, the read data string comprises read data, the read data is data bits and the number of the read data is equal to the second predetermined number of bits, and the third period is scheduled after the first period and the second period.

2. The interface transmission method as claimed in claim 1, further comprising, when the command is a read-write command, transmitting the write data string to the storage device by the processing device during the third period, and transmitting the read data string to be to the processing device by the storage device during a fourth period, wherein the fourth period is scheduled after the third period.

3. The interface transmission method as claimed in claim 1, further comprising, when the command is a read-write command, transmitting the read data string to the processing device by the storage device during the third period, and transmitting the write data string to the storage device by the processing device during a fourth period, wherein the fourth period is scheduled after the third period.

4. The interface transmission method as claimed in claim 1, further comprising transmitting a first undefined data string to the processing device by the storage device during a fourth period, wherein the first undefined data string comprises a first undefined data, the number of bits of the first undefined data is equal to the second predetermined number of bits, wherein the fourth period is scheduled between the first period and the second period.

5. The interface transmission method as claimed in claim 4, further comprising:
transmitting a third command string to the storage device by the processing device during a fifth period, wherein the number of bits of the third command string is equal to the first predetermined number of bits, and the fifth period is scheduled between the second period and the third period; and
transmitting a second undefined data string to the processing device by the storage device during a sixth period, wherein the second undefined data string comprises a second undefined data, the number of bits of the second undefined data is equal to the second predetermined number of bits, and the sixth period is scheduled between the fifth period and the second period, wherein the step of obtaining the command further comprise combining the third command string with the first command string and the second command string.

6. The interface transmission method as claimed in claim 5, wherein the first undefined data and the second undefined data is invalid data.

* * * * *